US005184648A

United States Patent [19]

Walter et al.

[11] Patent Number: 5,184,648

[45] Date of Patent: Feb. 9, 1993

[54] SOLENOID-OPERATED VALVE FOR MOUNTING IN SERIATIM HAVING AUTOMATIC WIREWAY DEVICE

[75] Inventors: Thomas R. Walter, Nicholasville; Roger T. Cox, Lawrenceburg, both of Ky.

[73] Assignee: The Rexroth Corporation, Lexington, Ky.

[21] Appl. No.: 874,597

[22] Filed: Apr. 27, 1992

[51] Int. Cl.$^5$ .................... F16K 11/00

[52] U.S. Cl. .................... 137/884; 137/560; 439/680

[58] Field of Search .................... 137/560, 884; 439/262, 439/263, 840, 677, 678, 680, 324, 700, 709, 712

[56] References Cited

U.S. PATENT DOCUMENTS

| | | | |
|---|---|---|---|
| 4,469,128 | 9/1984 | Petrimaux et al. | 137/554 |
| 4,486,060 | 12/1984 | Currall | 137/560 X |
| 4,671,600 | 6/1987 | Sawai et al. | 439/221 |
| 4,815,496 | 3/1989 | Nishitani et al. | 137/884 |
| 4,889,164 | 12/1989 | Hozumi et al. | 137/625 |
| 4,938,258 | 7/1990 | Sato | 137/884 |
| 4,949,757 | 8/1990 | Lashta | 137/884 |

FOREIGN PATENT DOCUMENTS

| | | | |
|---|---|---|---|
| 0057078 | 4/1985 | Japan | 137/884 |

OTHER PUBLICATIONS

Koganei, FM-Solid Manifold User's Manual WABCO, Pneumatic Directional Valves Industrial Type.

*Primary Examiner*—John C. Fox
*Attorney, Agent, or Firm*—Buchanan Ingersoll

[57] ABSTRACT

A solenoid operated valve comprising a valve body having at least one solenoid unit mounted on an end thereof. Each solenoid unit contains a solenoid electrically operable to control valve means within the valve body. The valve may further comprise a manifold segment in fluid interface with the valve means. An automatic wireway device is provided comprising a modular wireway segment typically attached to the manifold segment. The wireway device automatically connects each solenoid to a selected electrical actuation channel. This connection is made by indexing plungers located within bores in the wireway segment. The plungers are movable upon engagement with similar plungers such that a contact means on the plunger is received into a radial detent having therein a channel contact. The channel contacts are each electrically conntected to one of the electrical channels. The contact means on the plunger is electrically connected to the soleoid. Typically, separate case ground and solenoid neutral conductors are contained within the wireway segment and also connected to the solenoid unit.

53 Claims, 6 Drawing Sheets

SOLENOID-OPERATED VALVE FOR MOUNTING IN SERIATIM HAVING AUTOMATIC WIREWAY DEVICE

BACKGROUND OF THE INVENTION

1. Field of the Invention

The present invention generally relates to solenoid operated valves. More particularly, the invention relates to a solenoid operated valve suitable for mounting in seriatim arrangement having an automatic wireway device thereon for providing interconnection of the operating solenoids to selected electrical channels.

2. Description of the Prior Art

With hydraulic or pneumatic systems, it is frequently desirable to utilize a bank of valves comprising a plurality of valves mounted in seriatim arrangement on a manifold base. This permits centralized control as well as significantly reducing the number of necessary feeder lines. The manifold base may be constructed integrally or as modular segments individually attached to each valve. Frequently, the valves are controlled in one or both directions by electric solenoids.

The use of electric solenoids has required the connection of electrical conductors individually to each solenoid unit. Present methods of wiring involve pulling conductor wires through a "wireway conduit" and making direct connection to either the solenoids or a built-in connection terminal at each valve. These connections are typically made through a small access door or opening on a conduit connector attached to the solenoid unit. Crimping tools or wire nuts are generally required to complete the task.

Various power feeder arrangements have been proposed to alleviate this problem. These methods typically involve the use of printed wiring boards to route channel conductors to individual solenoids. These systems have frequently required special brackets to maintain the wiring board, thus complicating the assembly of a bank of valves. Also, the desirable modularity of the valves has been diminished.

SUMMARY OF THE INVENTION

Solenoid operated valves practicing the present invention comprise a valve body having at least one solenoid unit mounted on an end thereof. Each solenoid unit contains a solenoid electrically operable to control valve means within the valve body. The valve may further comprise a manifold segment in fluid interface with the valve means. An automatic wireway device is provided comprising a modular wireway segment typically attached to a manifold segment. The wireway device automatically interconnects each of the solenoids to a selected respective electrical channel. Such interconnection is made by indexing plungers located within bores in the wireway segment. The plungers are longitudinally and rotatably movable upon engagement with similar plungers of adjacent wireway devices when the valves are mounted in seriatim. This movement causes a contact means on the respective plunger to be received into a radial detent having a channel contact. The contact means is electrically connected to the solenoid and the channel contacts are electrically connected to respective electrical channels. Electrical connection between the solenoid and the selected channel is thus effectuated. Typically, separate case ground and solenoid neutral conductors are contained within the wireway segment and are also connected to the solenoid.

DETAILED DESCRIPTION OF PRESENTLY PREFERRED EMBODIMENTS

In accordance with the invention, a solenoid operated valve of the type for mounting in seriatim may be provided which has thereon a wireway device for automatically providing proper interconnection between solenoids of the valve and selected electrical channels. Thus, connection of the solenoids to a source of electrical energy is accomplished without individual wiring. Furthermore, modularity of the individual valves is maintained.

Figure 1:
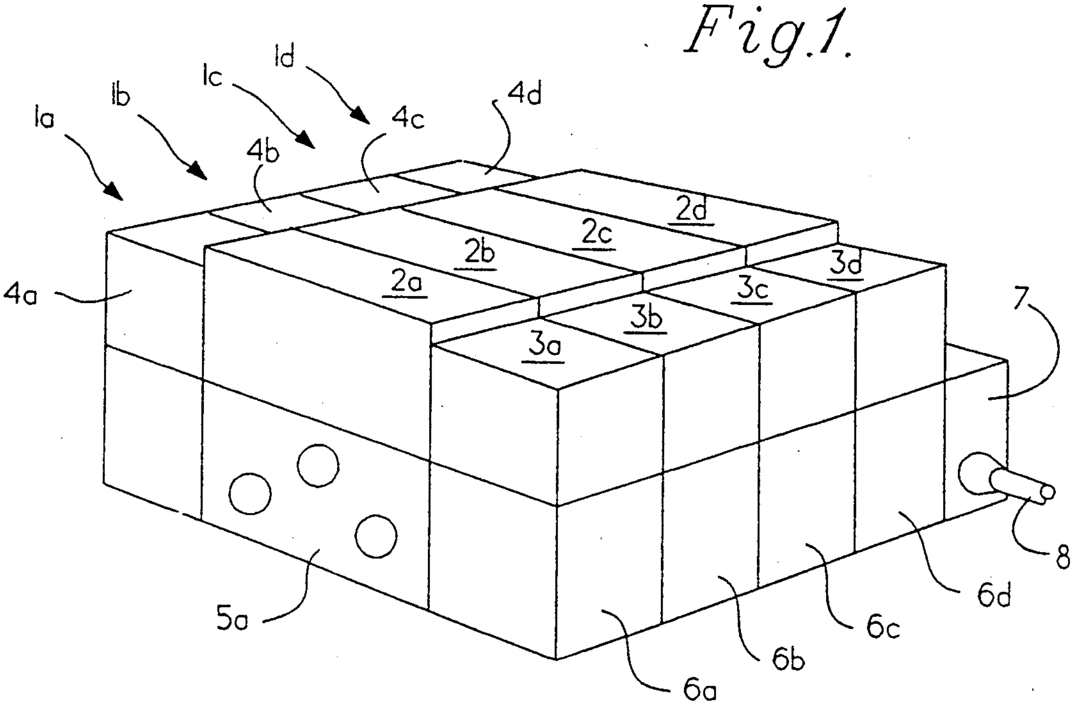
FIG. 1 is a diagramatic perspective view of a bank of double-solenoid operated valves mounted in seriatim according to the present invention.

FIG. 1 illustrates a plurality of modular valves mounted in seriatim to form a bank. The valves shown are of the double-solenoid operated type, although the invention also contemplates single-solenoid operated valves which may be constructed equally well according to the teachings herein. Each valve 1*a–d* has a main valve body 2*a–d*, respectively. The valve bodies 2*a–d* each have on opposite ends thereof respective solenoid units 3*a–d* and 4*a–d*. The valve bodies 2*a–d* contain valve means which are in fluid interface with respective manifold segments, such as manifold segment 5*a*, via fluid conduits on the bottom surface of the valve body and complementary conduits on the top surface of the manifold segment.

Figure 4:
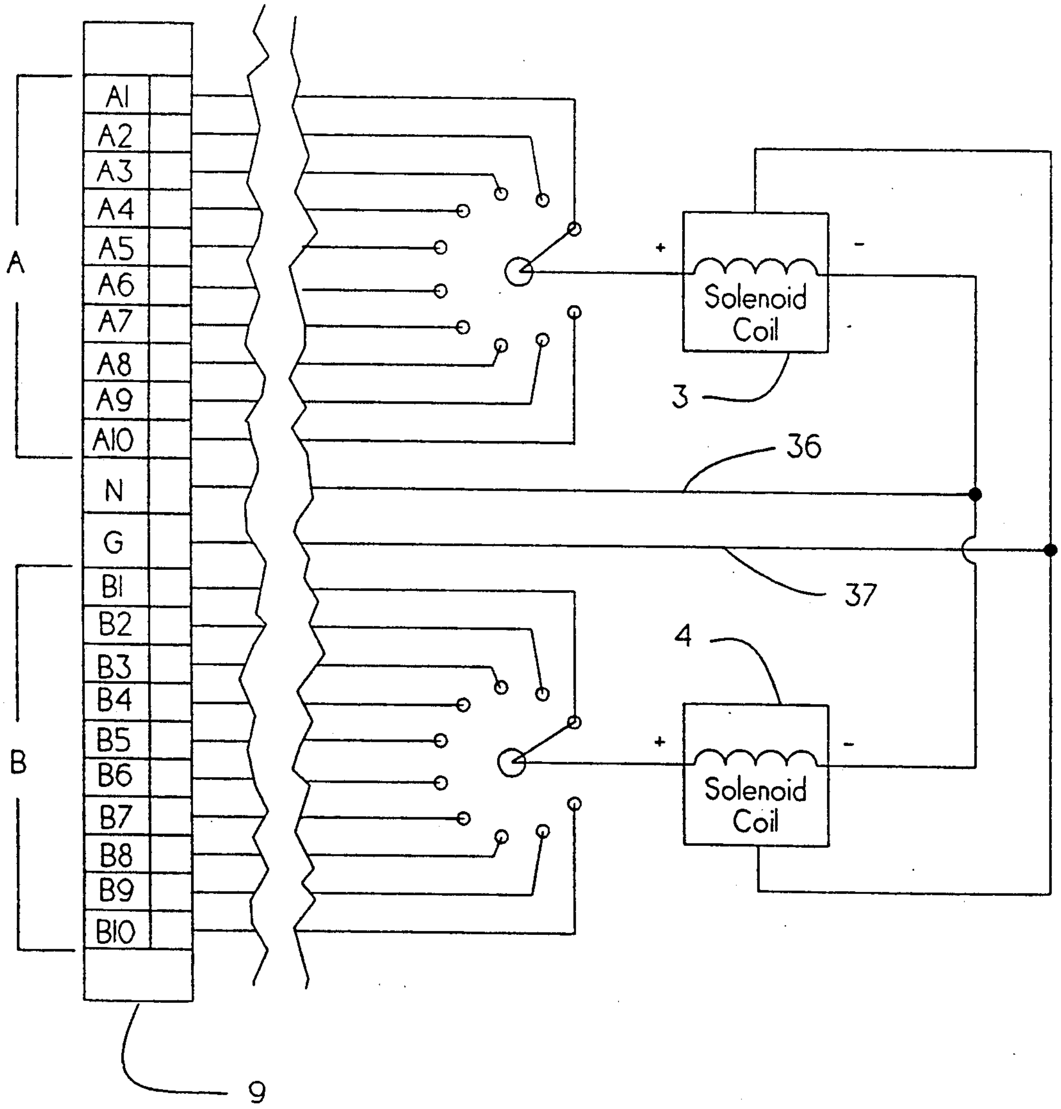
FIG. 4 is an electrical schematic illustrating the electrical connection of selected channels to respective solenoids of one double-solenoid operated valve.
Figure 6:
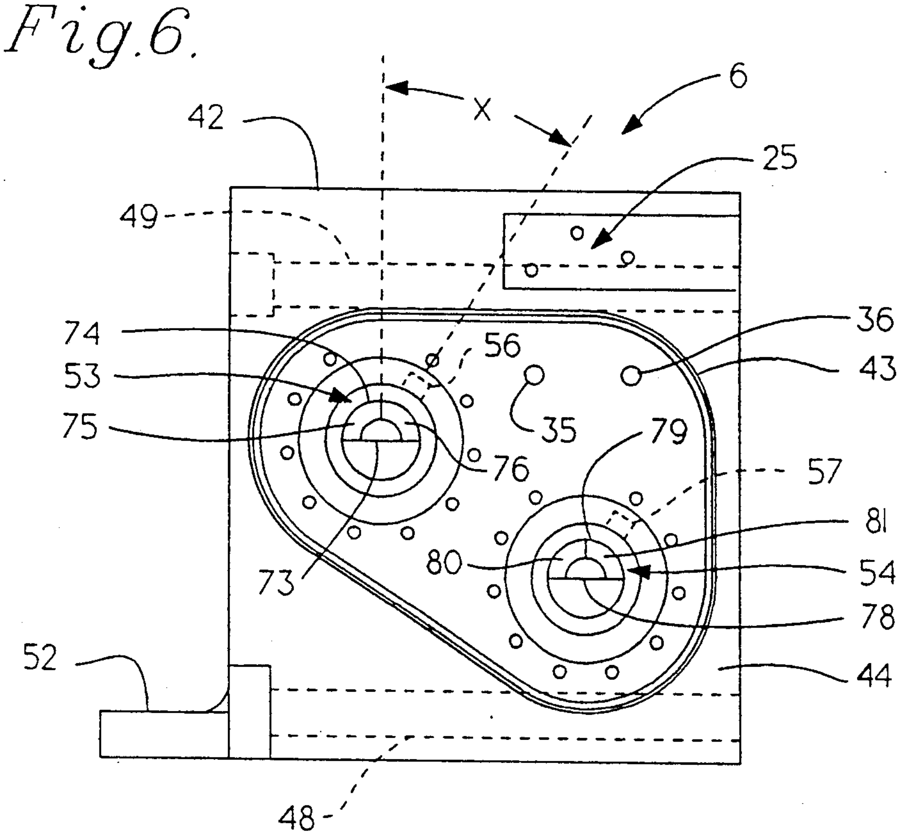
FIG. 6 is a front elevation of a presently preferred embodiment of a wireway segment constructed in accordance with the invention.
Figure 7:
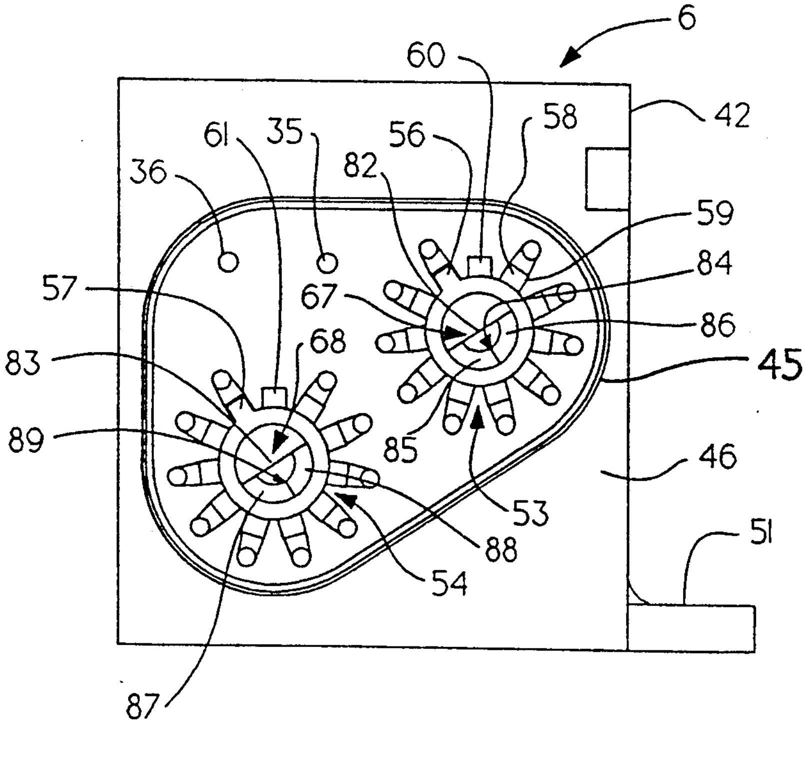
FIG. 7 is a back elevation of the wireway segment of FIG. 6.

Electrical connection to the solenoids of each valve is provided according to the invention by wireway segments 6*a–d*, respectively. Specifically, wireway segments 6*a–d* automatically select the proper channels of a plurality of channels passing therethrough to operate the solenoids of its respective valve depending upon the location of that valve in the bank. A terminal segment 7 provides an initial reference for operation of wireway segments 6a–d and also serves to route the various channels, for example by a conductor cable 8, to an easily accessible terminal strip 9 (FIG. 4).

Figure 2:
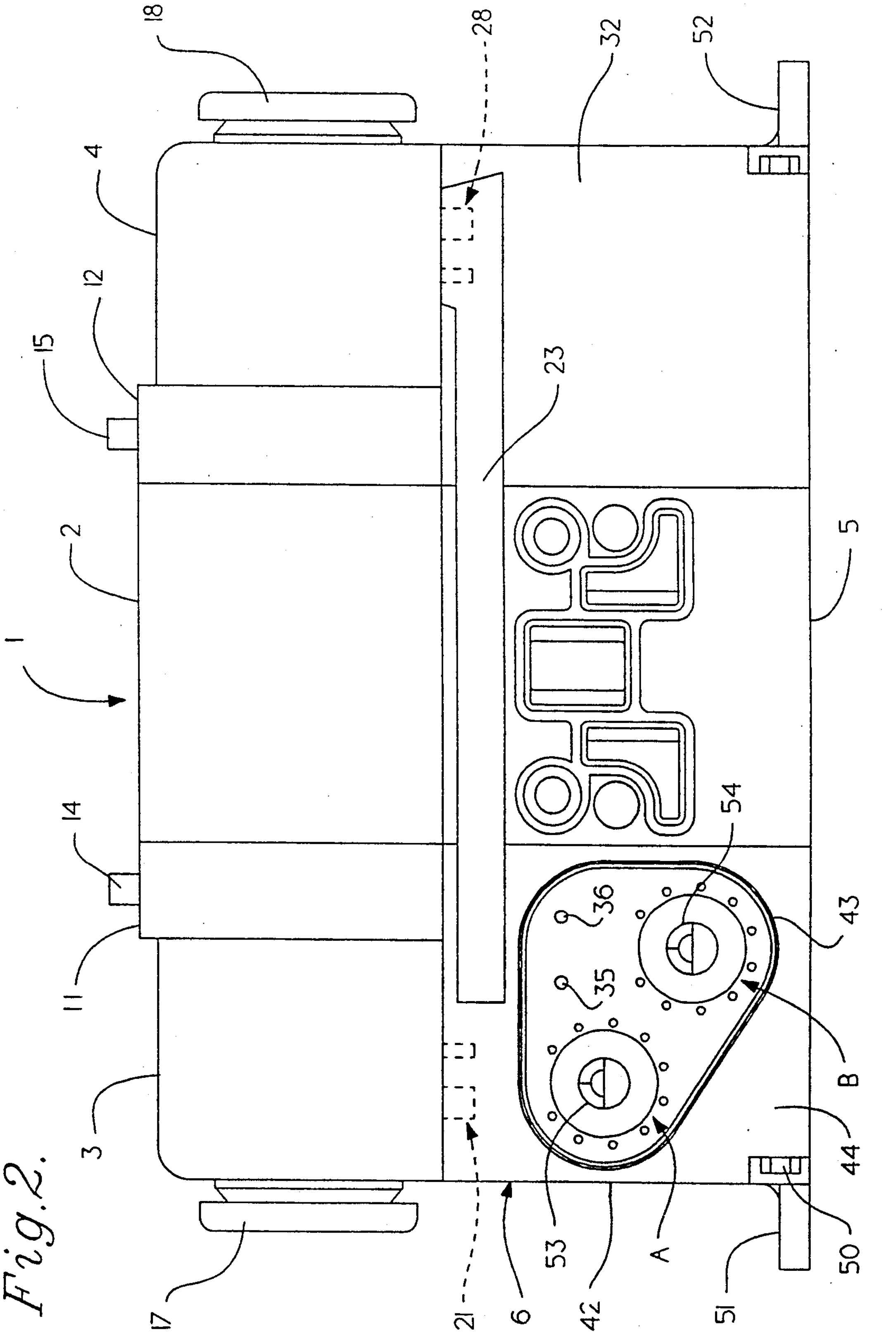
FIG. 2 is a front elevation of a double-solenoid operated valve constructed in accordance with the invention.
Figure 3:
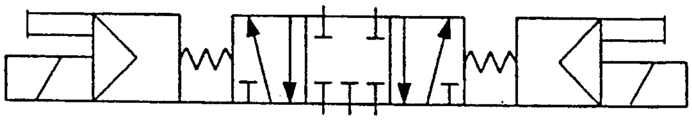
FIG. 3 is an operational schematic of a double-solenoid operated valve mechanism of the type which may be used with the present invention.

FIG. 2 illustrates a double-solenoid operated valve in which corresponding parts will be referenced by the numerical prefix used in FIG. 1. The valve means within valve body 2 may be any one of several suitable valve mechanisms such as a spool valve or a ceramic valve. Particularly, a double-pilot type ceramic valve having a schematic such as that shown in FIG. 3 is suitable for use with the invention. These valves may have an ISO size one (1) fluid passage interface at the junction of manifold segment 5 and valve body 2. End covers 11 and 12 contain the pilot operators and have respective buttons 14 and 15 for manual override of solenoid units 3 and 4. Solenoid retainer caps 17 and 18 facilitate easy replacement of coils comprising the solenoids within solenoid units 3 and 4, respectively.

Figure 5A:
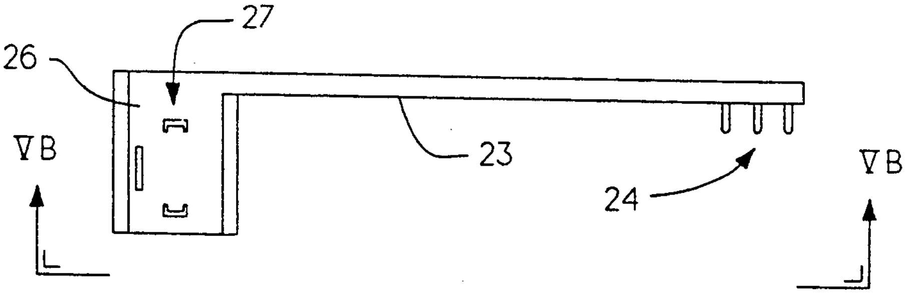
FIGS. 5A and 5B are a top view and a side elevation, respectively, of a plug-in connecting strip for providing electrical connection between a wireway segment of the invention and a remote solenoid.
Figure 5B:
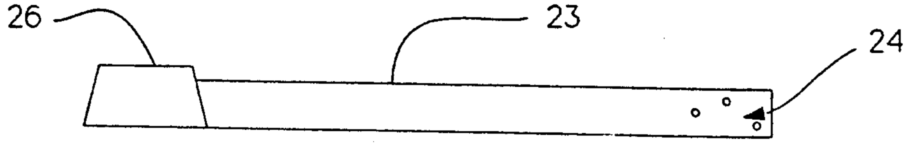
Figure 8:
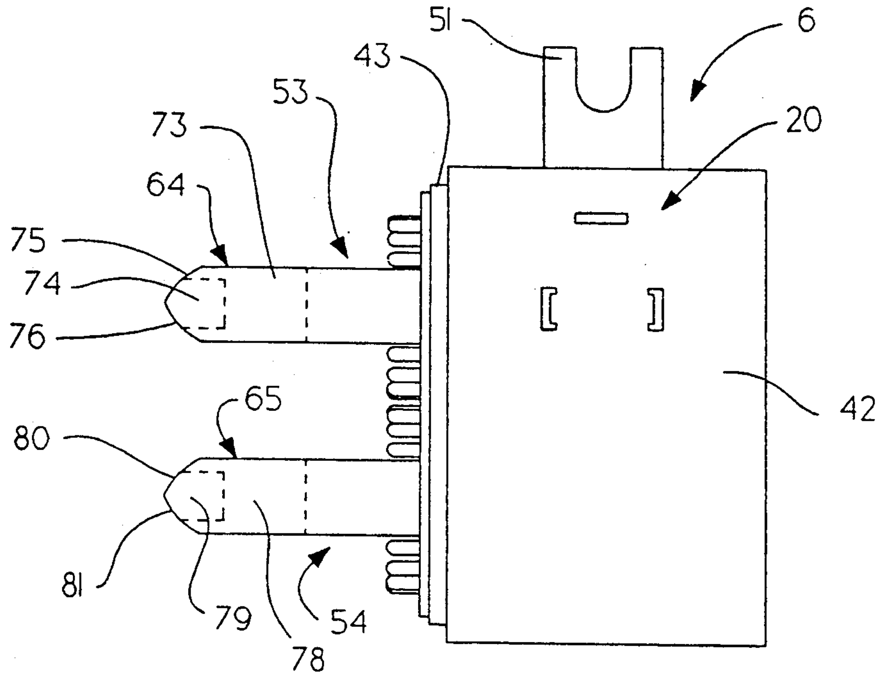
FIG. 8 is a top view of the wireway segment of FIG. 6.
Figure 9:
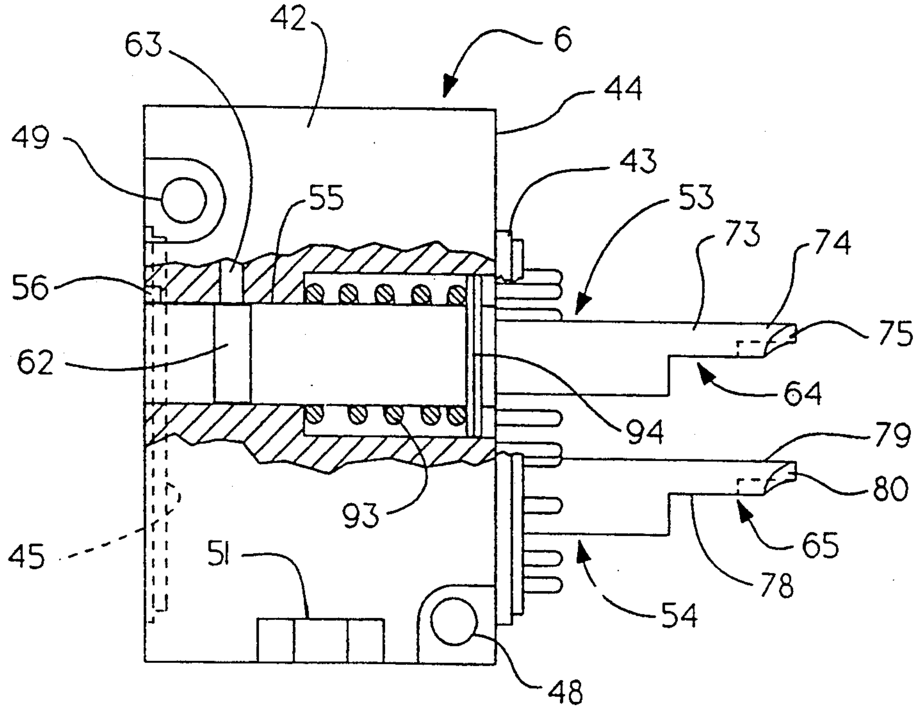
FIG. 9 is a side elevation of the wireway segment of FIG. 6 partially cut away to illustrate some internal components thereof.

Wireway segment 6 may be mounted below solenoid unit 3 so that direct electrical connection to the solenoid therein is easily made. This connection may be accomplished by any appropriate connection means, such as female receptacle 20 (FIG. 8) on wireway segment 6 matingly engaging a complementary male plug 21 depending from solenoid unit 3. In a single-solenoid operated valve, this would be all the connection means required. However, in a double-solenoid operated valve as shown, it is also necessary to electrically connect wireway segment 6 to the solenoid contained within opposite solenoid unit 4. This connection may be made by a conductor strip 23 which fits snugly within a complementary recess extending partially across the face of valve 1. As can be seen clearly in FIGS. 5A and 5B, conductor strip 23 has on one end thereof a male plug 24 which engages a complementary female receptacle 25 on wireway segment 6. An orthogonal end section 26 at the opposite end of conductor strip 23 has thereon a female receptacle 27 similar to female receptacle 20 of wireway segment 6 which receives male plug 28 depending from solenoid unit 4. End section 26 has a generally trapezoidal configuration which slides into a complementary recess in delivery port segment 32. Delivery port segment 32 may be a separate unit attached to manifold segment 5 as shown or may simply be an integral part of the manifold unit itself.

A number of rigid electrical conductors extend through wireway segment 6 and are engageable with similar conductors of adjacent wireway segments when valve 1 is mounted in seriatim. Thus, continuous electrical connection of the conductors is provided through the entire bank of valves. In presently preferred embodiments, two of these conductors are common—case ground conductor 35 and solenoid neutral conductor 36. For each solenoid there is also provided a set of a plurality of channel conductors. Thus, since there are two solenoid units in the embodiment shown, wireway segment 6 has two sets, reference A and B, of channel conductors. Set A comprises channels to operate solenoid unit 3 and set B similarly provides channels to operate solenoid unit 4. Up to all of the channels within sets A and B may carry an actuation signal. Generally, however, only one channel from each set will be used at a single valve location.

FIG. 4 schematically illustrates the electrical connection of a valve located in the first position within a bank. The solenoid within solenoid unit 3 is connected to channel A1. Similarly, the solenoid coil within solenoid unit 4 is connected to channel B1. The solenoids of the second such valve would contact channels A2 and B2, and so on. Wireway segment 6 here allows a maximum of ten valves to be mounted in seriatim. It should be realized, however, that this ten valve configuration is shown for purposes of illustration only and that wireway segments allowing a lesser or greater number of valves are contemplated by the invention.

The construction of wireway segment 6 is most readily apparent with reference to FIGS. 6–9. Wireway segment 6 is generally constructed having a modular housing 42. Housing 42 may have means thereon, such as sealing ridge 43 on front face 44 and complementary sealing through 45 on back face 46, to facilitate sealing engagement with similar wireway segments mounted in seriatim. Such sealing means preferably circumscribes all components which are to engage similar components of other wireway segments. Housing 42 may further have through-bores 48 and 49 or other means to facilitate attachment to a manifold segment, such as by bolt 50 of FIG. 2. Side bracket 51, similar to side bracket 52 of delivery port segment 32 (FIG. 2) is provided to allow secure placement of valve 1 in position on any appropriate maintaining structure.

Connection to the selected channels within sets A or B is respectively made by longitudinally and rotatably movable indexing plungers 53 and 54 which are mounted within plunger bores, such as plunger bore 55, in modular housing 42. Each plunger has thereon contact means which are electrically connected to a respective solenoid. Indexing movement of the plunger into self-alignment causes the contact means to engage a channel contact which is electrically connected to the selected channel conductor. In presently preferred embodiments, the contact means comprises tooth contacts 56 and 57 of plungers 53 and 54, respectively. The channel contacts, such as contact 58, are preferably located within a detent, such as detent 59, on back face 46 of modular housing 42. The detents are displaced radially about the plunger by an angle "x" determined by the number of channels. Top or "starter" detents 60 and 61 may be provided having no associated channel contact. Thus, for the ten-channel per set configuration shown, there are eleven detents and the angle "x" is approximately 32.7 degrees. The channel conductors may also be displaced radially about the plunger so that the interconnecting distance between each channel contact and the respective channel conductor is minimized. This is not necessary, however, to the operation of the device and it may be desirable in other applications to place the channel conductors elsewhere. For example, the channel conductors could simply be aligned in rows.

An annular conducting band, such as conducting band 62 of plunger 53, is mounted around each plunger and is electrically connected to the respective tooth contact. Brush contacts, such as brush contact 63, slidably engage respective conducting bands to provide electrical connection of the connection means of the invention to the tooth contact.

In order to provide indexing movement, plungers 53 and 54 respectively have specially shaped front end sections 64 and 65 which project from front face 44 of housing 42. Front end sections 64 and 65 are configured to be receive' 'nto a female indexing receptacle having a generally complementary ingress radius and located on an opposite back end of similar plungers in a preceding wireway segment. Thus, plungers 53 and 54 have at the back end thereof female indexing receptacles 67 and 68, respectively. Indexing receptacles 67 and 68 are in respective alignment with tooth contacts 56 and 57 and are respectively displaced from front end sections 64 and 65 by angle "x."

Figure 11:
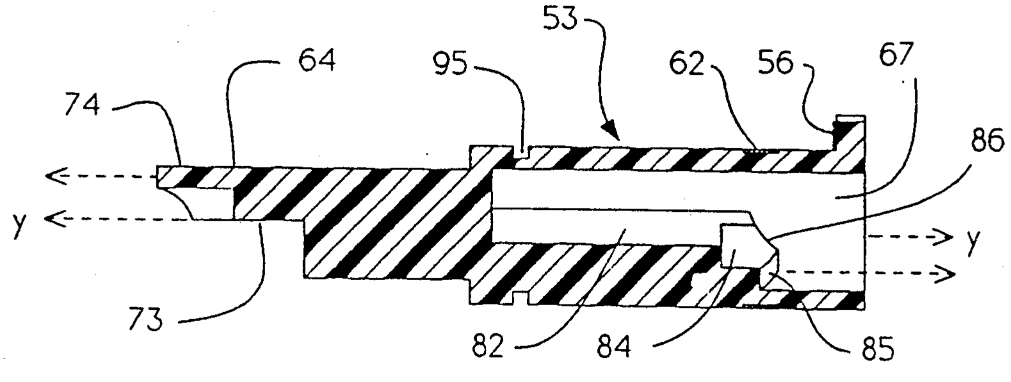
FIG. 11 is a cross sectional view taken along line 11—11 of FIG. 10A illustrating a presently preferred plunger for use with the present invention.

End section 64 comprises a generally semi-cylindrical member 73 having an integral indexing tip 74. Tip 74 is defined by end surfaces 75 and 76 which converge to form a point in the outward direction on an axis parallel to longitudinal axis "y" (FIG. 11) of plunger 53. Similarly, front end section 65 comprises semi-cylindrical member 78 having integral indexing tip 79. Tip 79 is defined by converging end surfaces 80 and 81.

Indexing receptacles 67 and 68 respectively have therein integral semi-cylindrical steps 82 and 83 which define a semicylindrical cavity for receiving front end sections of adjacent plungers. Integral with step 82 is a receptacle tip 84 which is formed by the convergence of walls 85 and 86 along an axis parallel to longitudinal axis "y" of plunger 53. Similarly, walls 87 and 88 extend from step 83 and converge to form receptacle tip 89.

Figure 10A:
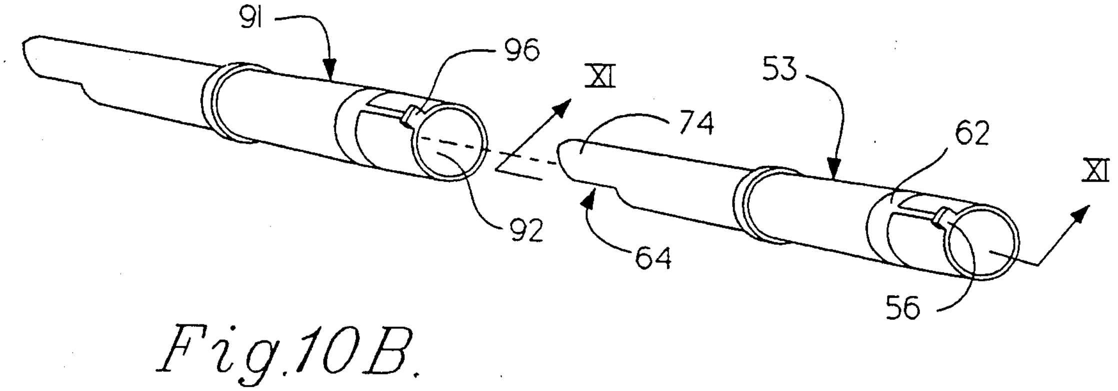
FIGS. 10A, 10B and 10C are sequential perspective views illustrating engagement of plungers of adjacent wireway segments mounted in seriatim.
Figure 10B:
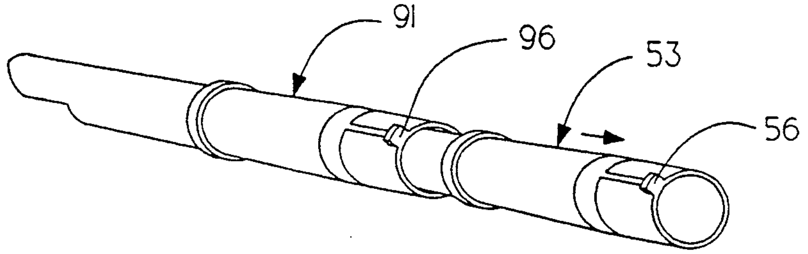
Figure 10C:
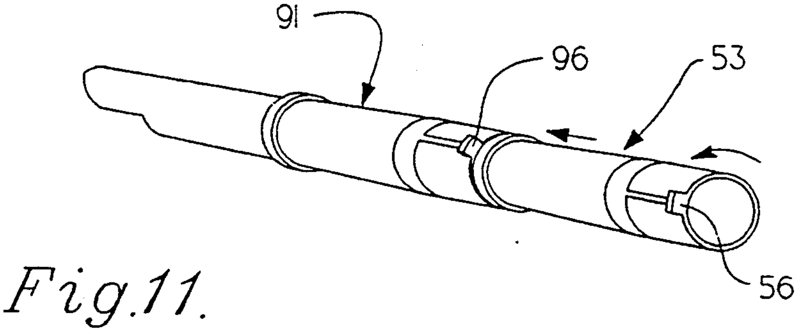

Referring particularly to FIGS. 10A, 10B and 10C, plunger 53 is illustrated engaging a similar plunger 91 of a preceding wireway segment mounted in seriatim. After entering indexing receptacle 92, indexing tip 74 engages the receptacle tip therein. As housing 42 and the housing containing plunger 91 are brought into sealing engagement, plunger 53 is moved backwards against the force of compression spring 93 (FIG. 9) or other appropriate urging means. Spring 93 is captively mounted around plunger 53 behind a snap ring 94 or the like which is attached to plunger 53 at snap ring groove 95.

The force of spring 93 and the respective generally triangular points of the engaging tips causes plunger 53 to move helically, rotating until end section 64 is seated within the semi-circular cavity in receptacle 92. In this way, tooth contact 56 is offset from tooth contact 96 of plunger 92 by angle "x." Thus, the next channel will be selected. Similarly, another plunger engaging plunger 53 at indexing receptacle 67 will automatically select the next channel, and so on. Terminal segment 7 (FIG. 1) defines fixed indexing receptacles which index plungers of the first wireway segment.

It can thus be seen that a solenoid operated valve of the type for mounting in seriatim has been provided having a wireway device which automatically provides proper interconnection between respective solenoids of the valve and a proper actuation channel. The invention eliminates the need to individually connect the solenoids, thus simplifying the assembly of a bank of valves. Furthermore, the need for application-specific parts is reduced, thus optimizing modularity. Although presently preferred embodiments have been described and shown herein, it is to be understood that various other embodiments and modifications can be made within the scope of the following claims.

We claim:

1. A solenoid operated valve suitable for mounting in seriatim arrangement with other valves, said valve comprising:

a valve body having valve means therein for controlling the passage of a fluid;

at least one solenoid unit having a solenoid therein, each of said solenoid units mounted on said valve body and electrically operable to control said valve means;

a wireway segment electrically connected to each said solenoid to provide automatic interconnection of said solenoid to at least one selected one of a plurality of electrical channel conductors;

said wireway segment having at least one bore having mounted therein a longitudinally and rotatably movable elongated indexing plunger, each said plunger having a first end section and an opposite second end section, said first end section having an indexing tip, said second end section defining an indexing receptacle angularly displaced from said tip by a predetermined angle;

said wireway segment having a plurality of channel contacts displaced about each said plunger and electrically connected to respective channel conductors, each said plunger further having thereon a contact means selectively engageable with at least one of said plurality of channel contacts upon rotation of said plunger;

whereby engagement of respective plungers of adjacent wireway segments of similar solenoid operated valves mounted in seriatim rotates said respective plungers to automatically provide selective electrical interconnection between respective solenoids of said similar solenoid operated valves and selected electrical channels.

2. The solenoid operated valve of claim 1 further comprising a manifold segment attached to said valve body.

3. The solenoid operated valve of claim 2 wherein said wireway segment has a width generally equal to a width of said manifold segment, said wireway segment attached to said manifold segment.

4. The solenoid operated valve of claim 1 wherein said plurality of channel contacts are radially displaced about said plunger generally by said predetermined angle.

5. The solenoid operated valve of claim 1 further comprising connection means for selectively establishing electrical connection between said wireway segment and said solenoid.

6. The solenoid operated valve of claim 1 wherein said plurality of electrical channel conductors comprises a plurality of rigid conductors extending through said wireway segment.

7. The solenoid operated valve of claim 1 wherein each said plunger has on an intermediate section thereof an annular conducting band electrically connected to said contact means, said wireway segment further comprising a brush contact engaging said conducting band.

8. The solenoid operated valve of claim 6 wherein said plurality of rigid conductors is displaced radially about said plunger.

9. The solenoid operated valve of claim 1 wherein said indexing tip comprises, in an outward axial direction, a semicylindrical member and an integral point member.

10. The solenoid operated valve of claim 9 wherein said integral point member includes a pair of end surfaces converging on an axis parallel to a longitudinal axis of said plunger to form a generally triangular point.

11. The solenoid operated valve of claim 1 wherein said indexing receptacle has an ingress radius generally complementary to a radius of said semicylindrical member.

12. The solenoid operated valve of claim 1 wherein said indexing receptacle has therein a step defining a generally semicylindrical cavity offset from indexing tip by said predetermined angle, said step having a point member projecting in an outward axial direction.

13. The solenoid operated valve of claim 1 wherein each said indexing tip comprises, in a first outward axial direction, a semicylindrical member and an integral first point member, said first point member having a first pair of end surfaces converging on an axis parallel to a longitudinal axis of said plunger to form a generally triangular point, further wherein said indexing receptacle has an ingress radius generally complementary to a radius of said semicylindrical member, said receptacle further having therein an integral step defining a semicylindrical cavity offset from said semicylindrical member by said predetermined angle, said step having a second integral point member having a second pair of end surfaces converging in an opposite second outward axial direction on said axis parallel to said longitudinal axis of said plunger.

14. The solenoid operated valve of claim 1 wherein said wireway segment further comprises a compression spring captively mounted around said plunger for urging said plunger into self-alignment upon engagement with a similar plunger.

15. A solenoid operated valve suitable for mounting in seriatim arrangement with other valves, said valve comprising:

a valve body having valve means for controlling the passage of a fluid;

a first solenoid unit mounted on a first end of said valve body and a second solenoid unit mounted on an opposite second end of said valve body, said first and second solenoid units respectively having a first and a second solenoid, said solenoid units electrically operable to control said valve means and;

a wireway segment electrically connected to said solenoids to provide respective automatic interconnection of said solenoids to at least one selected one of a first and a second set of a plurality of electrical channel conductors;

said wireway segment having a first bore and a second bore, said bores having respectively mounted therein first and second longitudinally and rotatably movable elongated indexing plungers, each said plunger having a first end section and an opposite second end section, each said first end section having an indexing tip, each said second end section defining an indexing receptacle angularly displaced from said indexing tip by a predetermined angle;

said wireway segment further having a first and a second set of a plurality of channel contacts displaced respectively about said first and second plungers, each said plunger further having thereon contact means selectively engageable upon rotation of respective plungers with at least one channel contact of said first and second set of a plurality of channel contacts;

whereby engagement of respective plungers of adjacent wireway segments of similar solenoid operated valves mounted in seriatim rotates said plungers to automatically provide selective electrical interconnection between respective solenoids of said similar solenoid operated valves and selected electrical channels.

16. The solenoid operated valve of claim 15 wherein said plurality of channel contacts are radially displaced about said plunger generally by said predetermined angle.

17. The solenoid operated valve of claim 15 further comprising connection means for selectively establishing respective electrical connection between said wireway segment and said solenoids.

18. The solenoid operated valve of claim 17 further comprising a plug-in connecting strip for providing electrical connection between said wireway segment and said second solenoid.

19. The solenoid operated valve of claim 15 wherein said first and second set of a plurality of electrical channel conductors each comprises a set of a plurality of rigid conductors extending through said wireway segment.

20. The solenoid operated valve of claim 15 wherein said first and second plungers each have on an intermediate section thereof an annular conducting band electrically connected to a respective contact means, said wireway segment further comprising brush contacts respectively slidably engaging said conducting bands.

21. The solenoid operated valve of claim 15 wherein said wireway segment further comprises a first and a second compression spring, said compression springs respectively captively mounted around said first and second plungers for urging said plungers into self-alignment upon engagement with plungers of an adjacent wireway segment.

22. The solenoid operated valve of claim 15 wherein said indexing tip comprises, in an outward axial direction, a semicylindrical member and an integral point member.

23. The solenoid operated valve of claim 22 wherein said integral point member includes a pair of end surfaces converging on an axis parallel to a longitudinal axis of said plunger to form a generally triangular point.

24. The solenoid operated valve of claim 15 wherein said indexing receptacle has an ingress radius generally complementary to a radius of said semicylindrical member.

25. The solenoid operated valve of claim 15 wherein said indexing receptacle has therein a step defining a generally semicylindrical cavity offset from indexing tip by said predetermined angle, said step having a point member projecting in an outward axial direction.

26. The solenoid operated valve of claim 15 wherein said indexing tips of said first and second plungers respectively comprise, in a first outward axial direction, a semicylindrical member and an integral first point member, said first point member having a first pair of end surfaces converging on an axis parallel to a longitudinal axis of said respective plunger to form a generally triangular point, said indexing receptacles having an ingress radius generally complementary to a radius of said semicylindrical member and further having therein an integral step defining a semicylindrical cavity offset from said semicylindrical member by said predetermined angle, said step having a second integral point member having a second pair of end surfaces converging in an opposite second outward axial direction on said axis parallel to said longitudinal axis of the respective plunger.

27. A wireway segment for a solenoid operated valve suitable for mounting in seriatim arrangement with other valves, said segment comprising:

a modular housing defining at least one bore therethrough;

connection means for establishing electrical connection to at least one solenoid;

a longitudinally and rotatably movable elongated indexing plunger located within each said bore, said plunger having a first end section and an opposite second end section, said first end section having an indexing tip, said second end section defining an indexing receptacle angularly displaced from said tip by a predetermined angle;

a plurality of electrical channel conductors;

at least one common conductor;

a plurality of channel contacts, said channel contacts respectively displaced about said plunger generally by said predetermined angle, each said channel contact electrically connected to one of said channel conductors; and contact means mounted on said plunger selectively engageable with at least one of said channel contacts;

whereby engagement of respective plungers of adjacent wireway segments mounted in seriatim rotates said respective plungers to automatically provide selective electrical interconnection to selected electrical channels.

28. The wireway segment of claim 27 further comprising sealing means on said modular housing.

29. The wireway segment of claim 27 wherein said connection means comprises a female receptacle on said modular housing.

30. The wireway segment of claim 27 wherein said plurality of electrical channel conductors comprises a plurality of rigid conductors extending through said modular housing.

31. The wireway segment of claim 30 wherein said rigid conductors are displaced radially about said plunger by said predetermined angle.

32. The wireway segment of claim 27 wherein said plunger has on an intermediate section thereof an annular conducting band electrically connected to said contact means and a brush contact slidably engaging said conducting band, said brush contact electrically connected to said connection means.

33. The solenoid operated valve of claim 27 wherein said indexing tip comprises, in an outward axial direction, a semicylindrical member and an integral point member.

34. The solenoid operated valve of claim 33 wherein said integral point member includes a pair of end surfaces converging on an axis parallel to a longitudinal axis of said plunger to form a generally triangular point.

35. The solenoid operated valve of claim 27 wherein said indexing receptacle has an ingress radius generally complementary to a radius of said semicylindrical member.

36. The solenoid operated valve of claim 27 wherein said indexing receptacle has therein a step defining a generally semicylindrical cavity offset from indexing tip by said predetermined angle, said step having a point member projecting in an outward axial direction.

37. The wireway segment of claim 27 wherein each said indexing tip comprises, in a first outward axial direction, a semicylindrical member and a first integral first point member, said point member having a first pair of end surfaces converging on an axis parallel to a longitudinal axis of said plunger to form a generally triangular point, further wherein said indexing receptacle has an ingress radius generally complementary to a radius of said semicylindrical member, said receptacle further having therein an integral step defining a semicylindrical cavity offset from said semicylindrical member by said predetermined angle, said step having a second integral point member having a second pair of end surfaces converging in an opposite second outward axial direction on said axis parallel to said longitudinal axis of said plunger.

38. The wireway segment of claim 27 further comprising a compression spring captively mounted around said plunger for urging said plunger into self-alignment.

39. The wireway segment of claim 27 wherein said at least one bore is a first bore and a second bore having respectively mounted therein a first and a second plunger.

40. The wireway segment of claim 27 wherein said plurality of channel contacts are radially displaced about said plunger generally by said predetermined angle.

41. A wireway device for automatically providing interconnection between external actuators and a respective first and second one of a plurality of channels, said device comprising:

a modular housing having therein a first bore and a second bore;

connection means for providing electrical connection to said external actuators;

a first and a second set of a plurality of electrical channels extending through said housing;

at least one common electrical conductor extending through said housing;

a first and a second longitudinally and rotatably movable elongated indexing plunger respectively located within said first and second bore, each said plunger having a first end section and an opposite second end section, said first end section having an indexing tip, said second end section defining an indexing receptacle angularly displaced from said tip by a predetermined angle;

a first and a second set of a plurality of channel contacts respectively displaced about said plunger generally by said predetermined angle, each of said channel contacts electrically connected to one of said plurality of electrical channel conductors; and first and second contact means respectively mounted on said first and second plungers and electrically connected to said connection means for respectively engaging one of said first and second set of channel contacts upon rotation of plungers to provide electrical connection of said selected first and second one of said plurality of channels to said connection means.

42. The wireway device of claim 41 wherein said channel contacts of said first and second set of channel contacts are respectively radially displaced about said plungers.

43. The wireway device of claim 41 wherein said first and second set of a plurality of electrical channel conductors comprises a first and second set of a plurality of rigid conductors respectively radially displaced about said first and second plunger generally by said predetermined angle.

44. The wireway device of claim 41 wherein said first and second set of rigid conductors respectively comprises ten rigid conductors and further wherein said predetermined angle is approximately 32.7 degrees.

45. The wireway device of claim 41 wherein said first and second pl ıgers each have on respective intermediate sections thereof an annular conducting band electrically connected to respective contact means, said wireway device further having a first and a second brush contact respectively slidably engaging conducting bands of said first and second plungers, said conducting bands electrically connected to said connection means.

46. The wireway device of claim 41 further comprising a first and a second compression spring respectively captively mounted around said first and second plungers for urging said plungers into self-alignment upon engagement with plungers of an adjacent wireway device mounted in seriatim.

47. The solenoid operated valve of claim 41 wherein said indexing tip comprises, in an outward axial direction, a semicylindrical member and an integral point member.

48. The solenoid operated valve of claim 47 wherein said integral point member includes a pair of end surfaces converging on an axis parallel to a longitudinal axis of said plunger to form a generally triangular point.

49. The solenoid operated valve of claim 41 wherein said indexing receptacle has an ingress radius generally complementary to a radius of said semicylindrical member.

50. The solenoid operated valve of claim 41 wherein said indexing receptacle has therein a step defining a generally semicylindrical cavity offset from indexing tip by said predetermined angle, said step having a point member projecting in an outward axial direction.

51. The wireway device of claim 41 wherein said indexing tips of said first and second plungers respectively comprise, in a first outward axial direction, a semicylindrical member and a first integral point member, said first point member having a first pair of end surfaces converging on an axis parallel to a longitudinal axis of said respective plunger to form a generally triangular point, said indexing receptacles having an ingress radius generally complementary to a radius of said semicylindrical member and further having therein an integral step defining a semicylindrical cavity offset from said semicylindrical member by said predetermined angle, said step having a second integral point member having a second pair of end surfaces converging in opposite second outward axial direction on said axis parallel to said longitudinal axis of the respective plunger.

52. The wireway device of claim 41 wherein said sealing means comprises a sealing ridge on a front face of said modular housing and a sealing trough defined by a back face of said modular housing.

53. The wireway device of claim 41 wherein said contact means comprises first and second tooth contacts respectively mounted on said first and second plungers, said tooth contacts offset from indexing tips of respective plungers by said predetermined angle.

* * * * *